June 28, 1927.

C. RIESEBECK 1,633,999

ELASTIC TIRE

Filed Nov. 3, 1922

Inventor
Curt Riesebeck,
By
Carl A. Hillmann,
Attorney

June 28, 1927.  C. RIESEBECK  1,633,999

ELASTIC TIRE

Filed Nov. 3, 1922    9 Sheets-Sheet 2

Inventor
Curt Riesebeck,
By Carl A. Hellmann,
Attorney

June 28, 1927.

C. RIESEBECK 1,633,999

ELASTIC TIRE

Filed Nov. 3, 1922

Inventor:
Curt Riesebeck.

June 28, 1927.

C. RIESEBECK 1,633,999

ELASTIC TIRE

Filed Nov. 3, 1922

C. RIESEBECK 1,633,999

ELASTIC TIRE

Filed Nov. 3, 1922

C. RIESEBECK 1,633,999

ELASTIC TIRE

Filed Nov. 3, 1922

Inventor:
Curt Riesebeck.

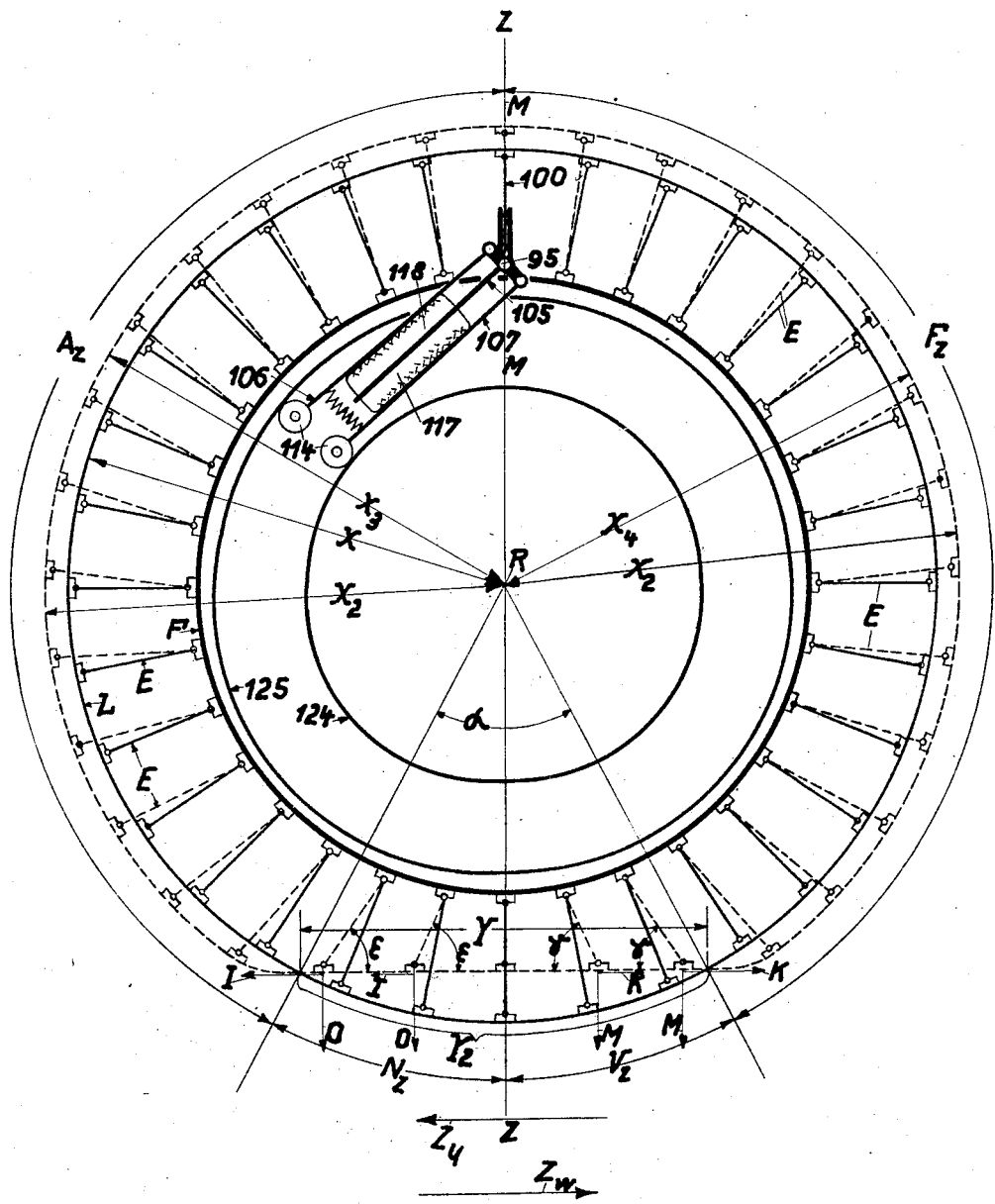

June 28, 1927.

C. RIESEBECK

ELASTIC TIRE

Filed Nov. 3, 1922

Patented June 28, 1927.

1,633,999

UNITED STATES PATENT OFFICE.

CURT RIESEBECK, OF BERLIN-FRIEDENAU, GERMANY.

ELASTIC TIRE.

Application filed November 3, 1922, Serial No. 598,732, and in Germany November 17, 1921.

My invention relates to vehicle tires of general utility wherever resilient tires or rigid wheels may be used. The invention is of the type commonly known as a resilient wheel, wherein the resiliency is obtained from springs instead of from a pneumatic tire.

In general the object is to produce an elastic tire having resiliency and elasticity equal to that of the ordinary pneumatic tire, which however does not lose its resiliency even when seriously damaged in some of its components, and which does not harden or otherwise deteriorate with service or age as does the ordinary rubber tire.

The invention comprises elements which are well known in themselves as well as other novel elements, all combined in a new way to provide a resilient wheel, as will be more readily understood from the following description of one embodiment thereof, in connection with the accompanying drawings, wherein—

Fig. 13 is a diagram illustrating the structure and mode of action of the tire;

Corresponding and like parts throughout the present description and drawings are designated by the same reference characters.

The elastic tire illustrated serves for use on a wheel 1 of standard type which is removably mounted on an axle, such as 3, supported in a bearing 2. The wheel 1 has a rim 4 which serves to hold the tire in any well known way as is usual with rubber tires.

Figure 1:
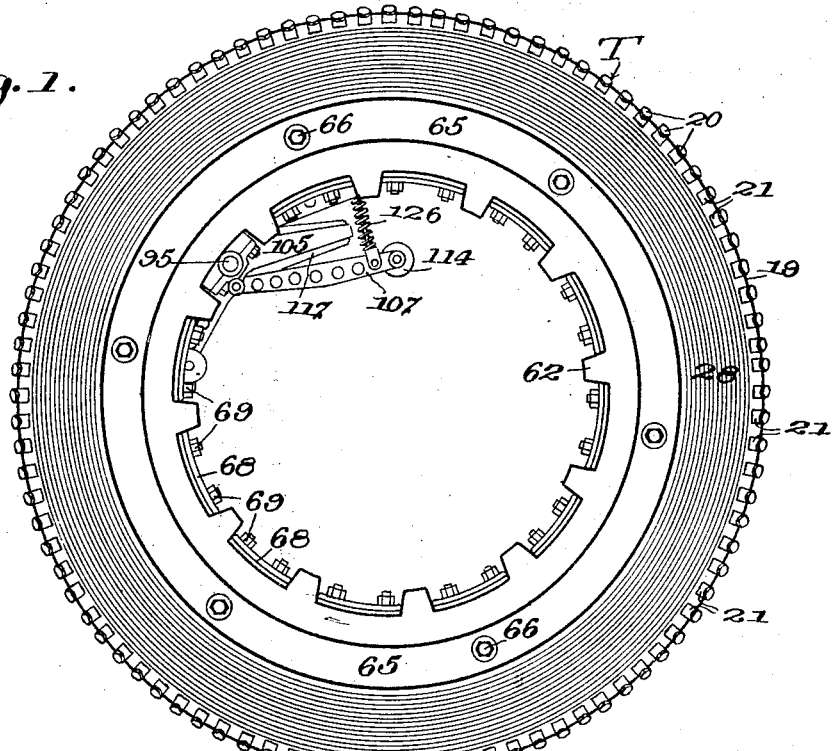
Fig. 1 is a front elevation of one embodiment of the invention.
Figure 10:
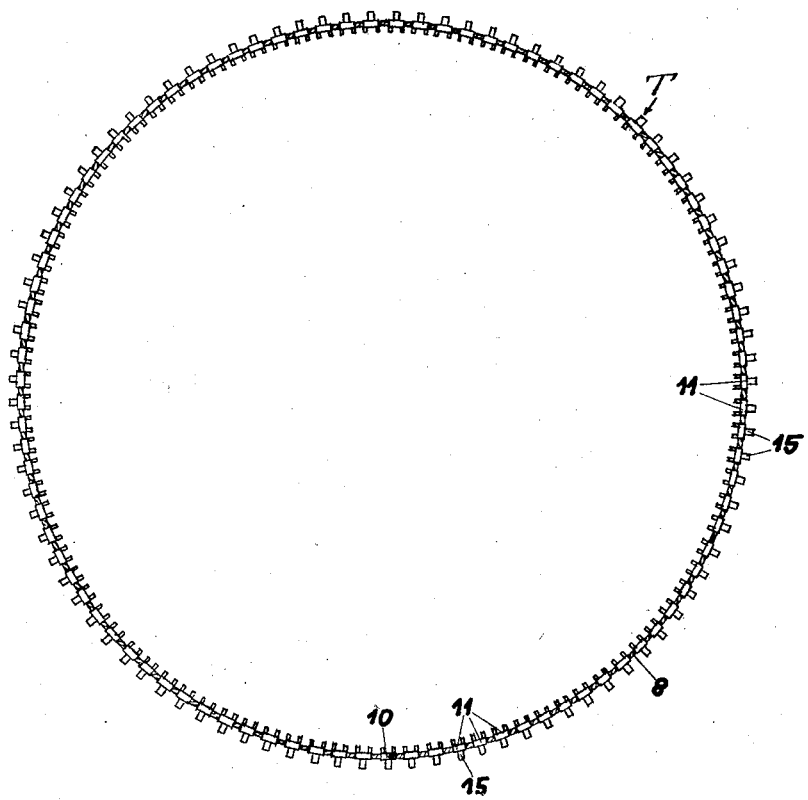
Fig. 10 is a side elevation of a tread-band.
Figure 11:
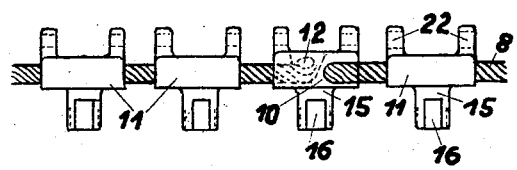
Fig. 11 shows a fragment of said band on an enlarged scale.
Figure 14:
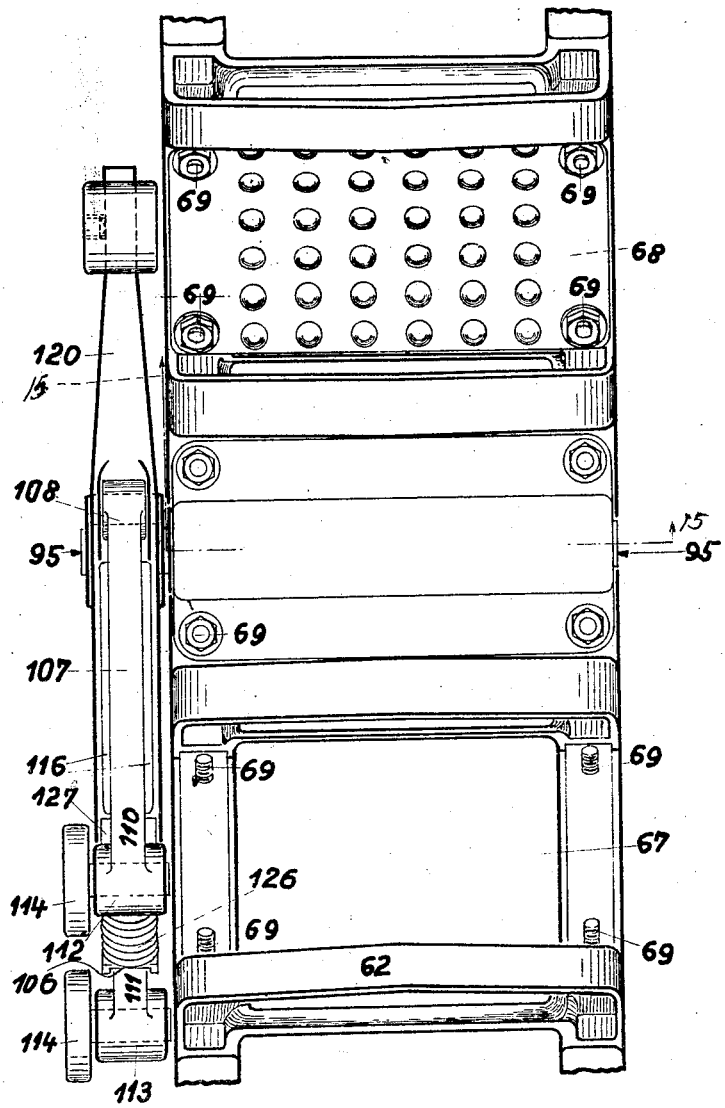
Fig. 14 shows part of the tire as viewed from the center.

The elastic tire comprises a yielding tread ring T best shown in Fig. 1, supported by elastic means on the rim 4 of a channel ring 1 constituting the portion of the wheel nearest to the hub. The tread ring comprises yielding tread bands each containing parts 8 to 16 inclusive, said tread bands being spaced from one another by cords 17, shown in section in Fig. 9, and in elevation in Fig. 8. The tread bands are held together by cross-cords which are twisted around the cords 17. Each tread band (see Figs. 10 and 11) comprises a metal rope 8, which has its ends joined by a member 10, similar members 11 being also threaded on this metal rope, uniformly spaced thereon as shown in Figs. 10 and 11. These tread-bands serve to carry a waterproof protective cover 19, as well as protecting sides 28, non-skid projections 20 and edge-protective caps 21. Each plate 10 and 11 has a projection 15 having a flattened portion 16, serving for the reception of waterproof cover 19, as well as the non-skid projection 20 and washers 42 or edge protective caps 21. The holders belonging to lateral tread bands have eyelets 22 for the reception of other parts of the tire described below. The protective cover may be of impregnated leather or of rubber, etc.

In order to properly position the sides 28, a guiding device is provided, comprising tensioned springs 29 and cords 32, positioned as shown, uniting the sides 28 and fixed to the latter by washers 30 and rivets 31. These elements are distributed uniformly to provide equal tensions throughout the tire. Each spring 29 parallel to the corresponding side 28, is fastened with one end to a lateral tread band and to the side 28 by metal eyelets 33. Both ends of the tension springs 29 are formed as hooks 340. The non-skid projections 20, washers 42 and plates 21 serve also to fix the tread-bands to the protective cover 19.

Figure 12:
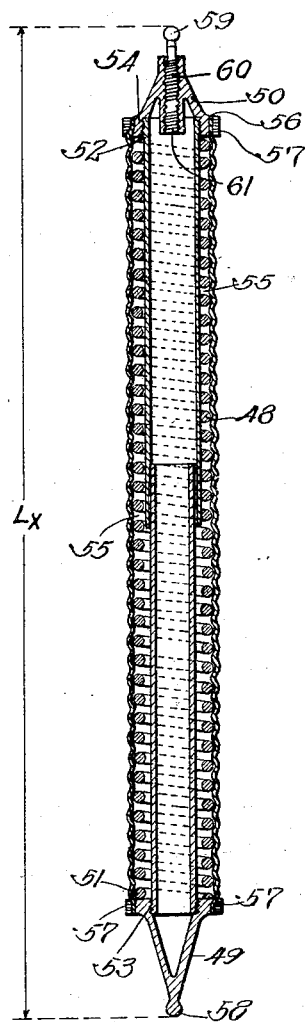
Fig. 12 is a longitudinal section of one of the elastic pressure elements.

Each tread ring is resiliently supported from ring 62 by elastic means such as shown in Fig. 12 in detail. Ring 62, of channel cross-section, constitutes a frame with side extensions 64 against which abut and are clamped the flexible side protectors 28 of the tread portion. The removable clamps 65 are held to the extensions 64 by means of screw bolts 66. The elastic means of Fig. 12 comprises compressed air or spring means or both. A helical spring 48 is arranged on two telescoping tubular guides 49, 50, the ends of said spring bearing on the end members 53, 54 which in turn transmit the pressure to the fixed terminal 58 and the adjustable terminal 59, the latter being threaded as shown at 60. An elastic cover 55, of leather or the like, has its ends 56 held to the elements 53 and 54 by rings 57, and serves to exclude dust and to retain a lubricant. The ends 58 and 59 are spherical to serve as universal supports and allow the elastic means to move freely in the ring and tread. This is shown diagrammatically in Fig. 13, wherein E designates each elastic element as a whole, and is shown more in detail in Fig. 8 which shows the elements E supported at their outer ends by members 11, already described, their inner ends being supported by the ring as shown.

Figure 9:
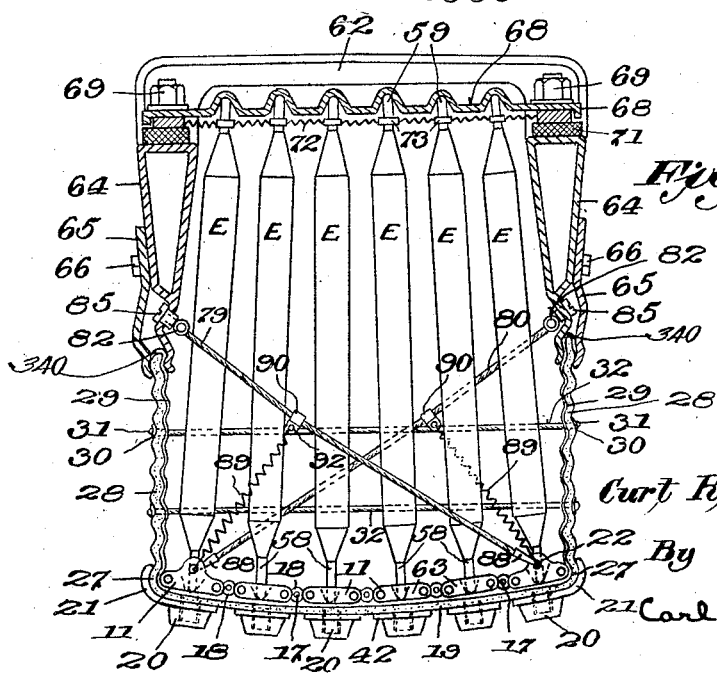
Fig. 9 is a transverse section of said tire on line 9—9 of Figs. 7 and 8.
Figure 8:
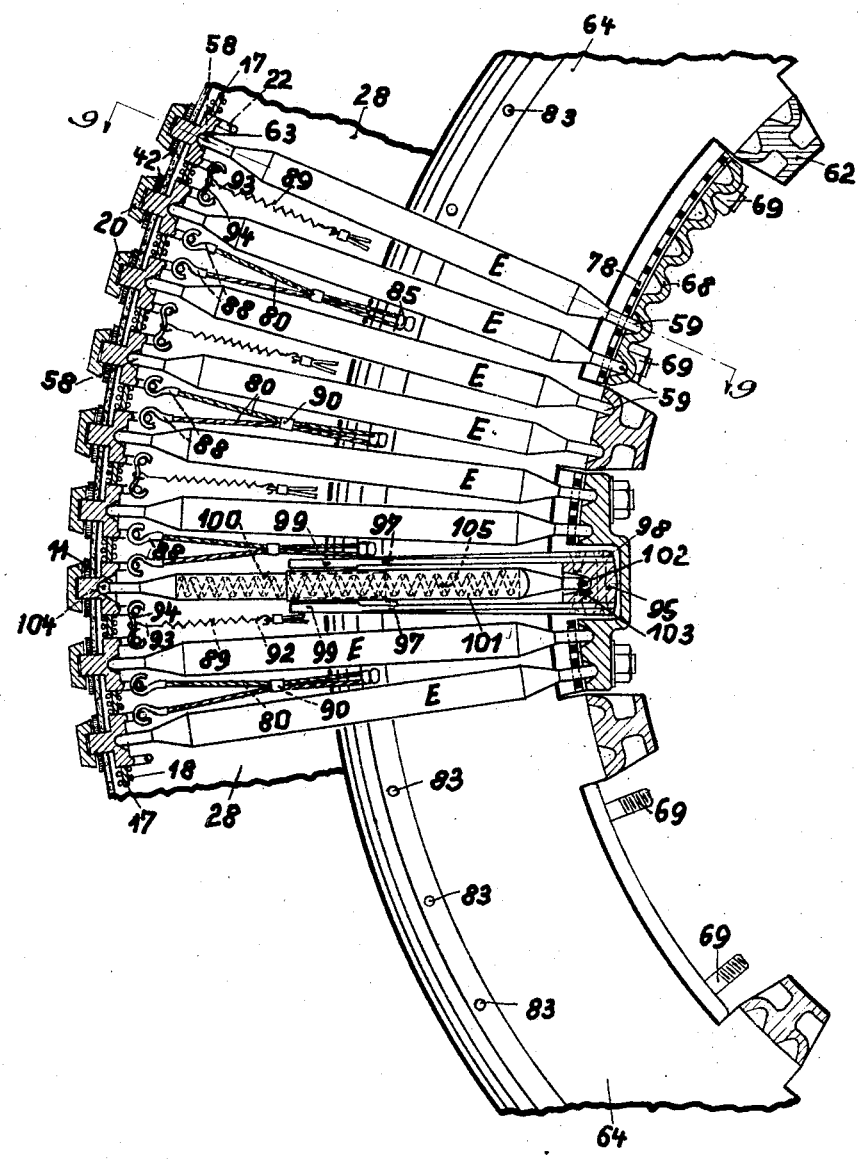
Fig. 8 is a fragmentary longitudinal section of the said tire.

Cords 80, Fig. 8, and 79, Fig. 9, transmit lateral forces from the ring to the yielding tread ring, each such cord being arranged in a radial cross-sectional plane of the tire, and being inclined to the longitudinal plane of the tire. The cord tension members 80 and spring tension members 89 are attached to the tread by means of terminal hooks 88 and 94, respectively, while the other ends of the cords are attached to the extension cheeks 64 by means of screws held in holes 83. A tensioning clasp 90 is provided for each pair of cords. It will thus be seen that flexible members 79, 80 under tension, which are non-stretchable, as well as compressible members E, are provided to produce a structure resembling, in its properties, a pneumatic tire of ordinary type.

Figure 2:
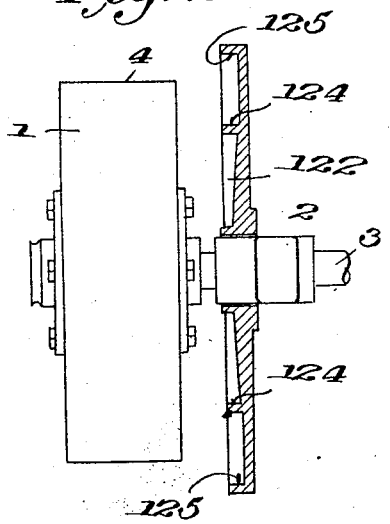
Fig. 2 shows a cam disc fixed to the bearing on which the wheel shown in Fig. 1 is mounted, the cam disc being shown in section.
Figure 3:
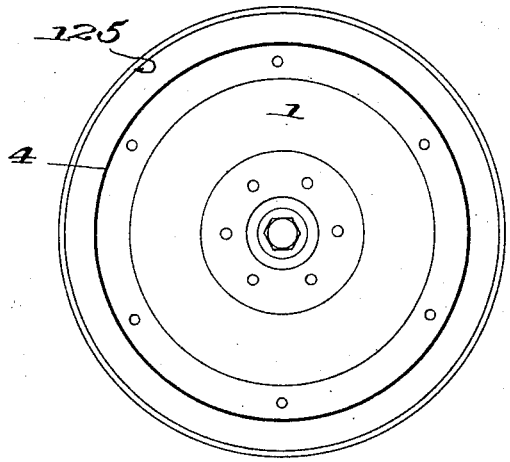
Fig. 3 is a front view of the elements shown in Fig. 2.
Figure 15:
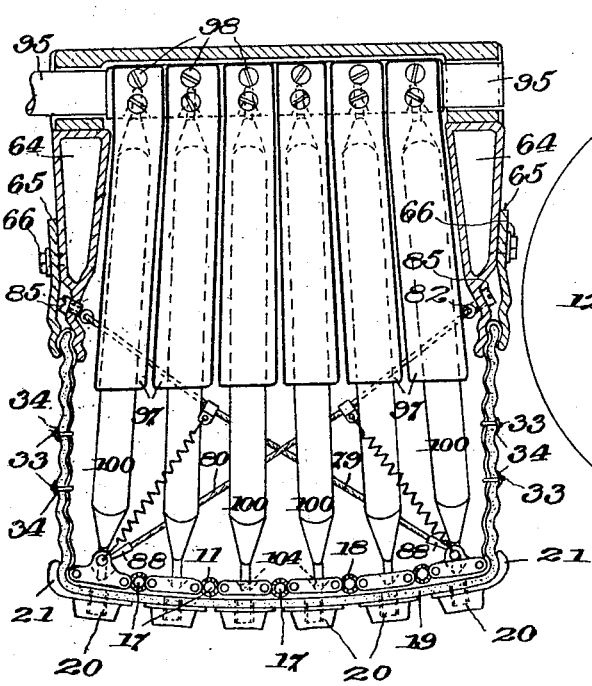
Fig. 15 is a section on line 15—15 of Figure 14.
Figure 4:
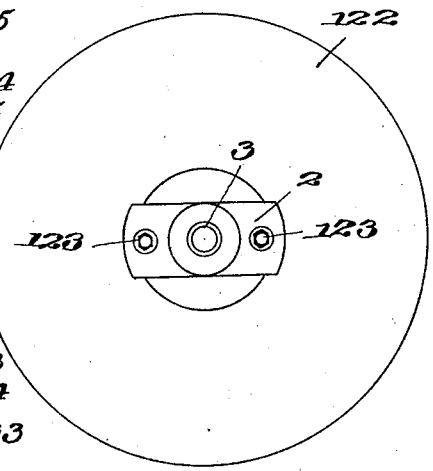
Fig. 4 is a rear view of the elements shown in Figs. 2 and 3.
Figure 5:
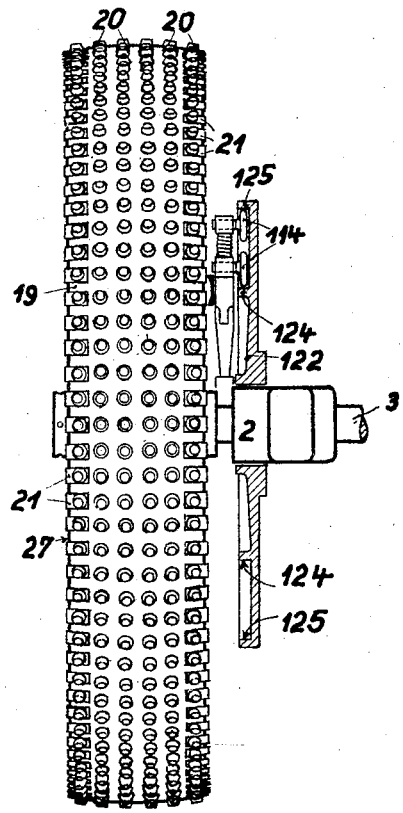
Fig. 5 is a side elevation of the tire and wheel shown in Fig. 1, the cam disc being shown in section.
Figure 6:
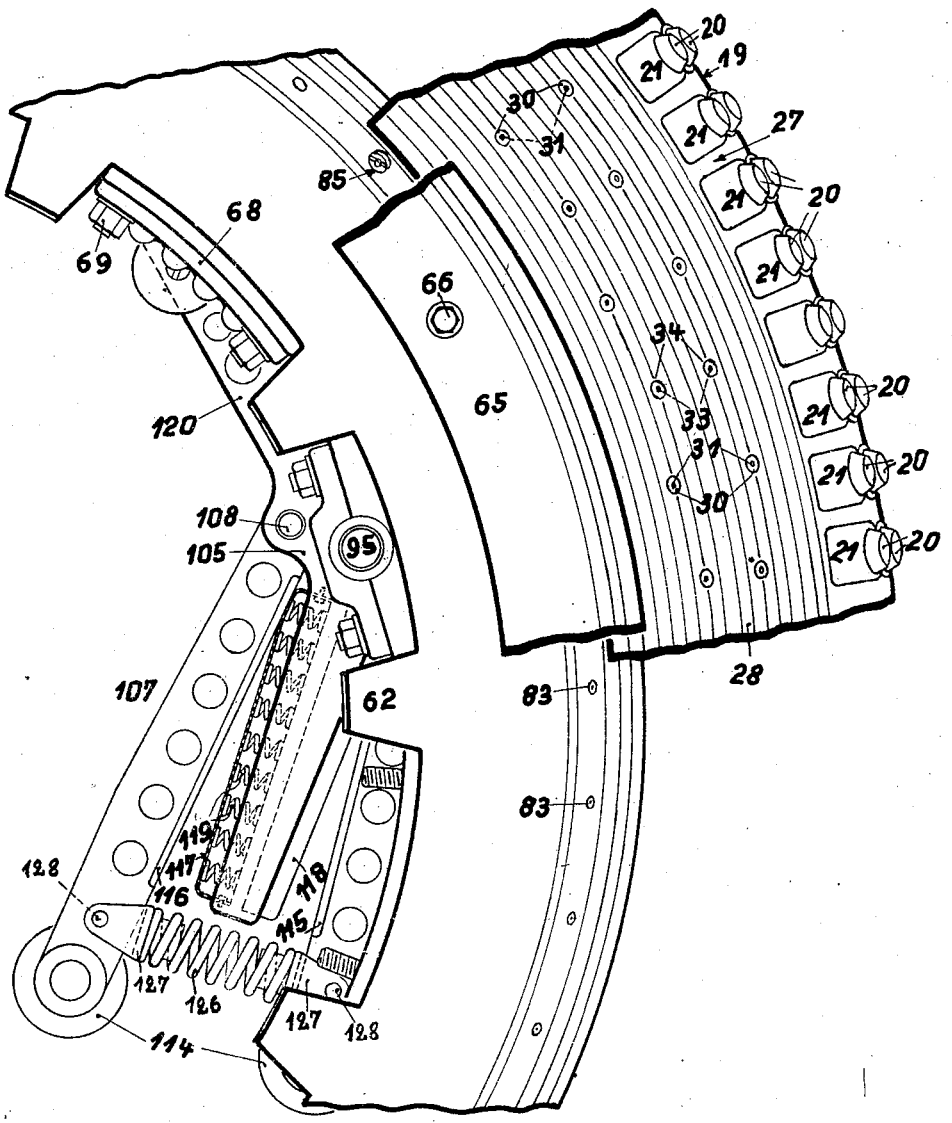
Fig. 6 is a fragmentary front elevation of the tire on an enlarged scale.
Figure 7:
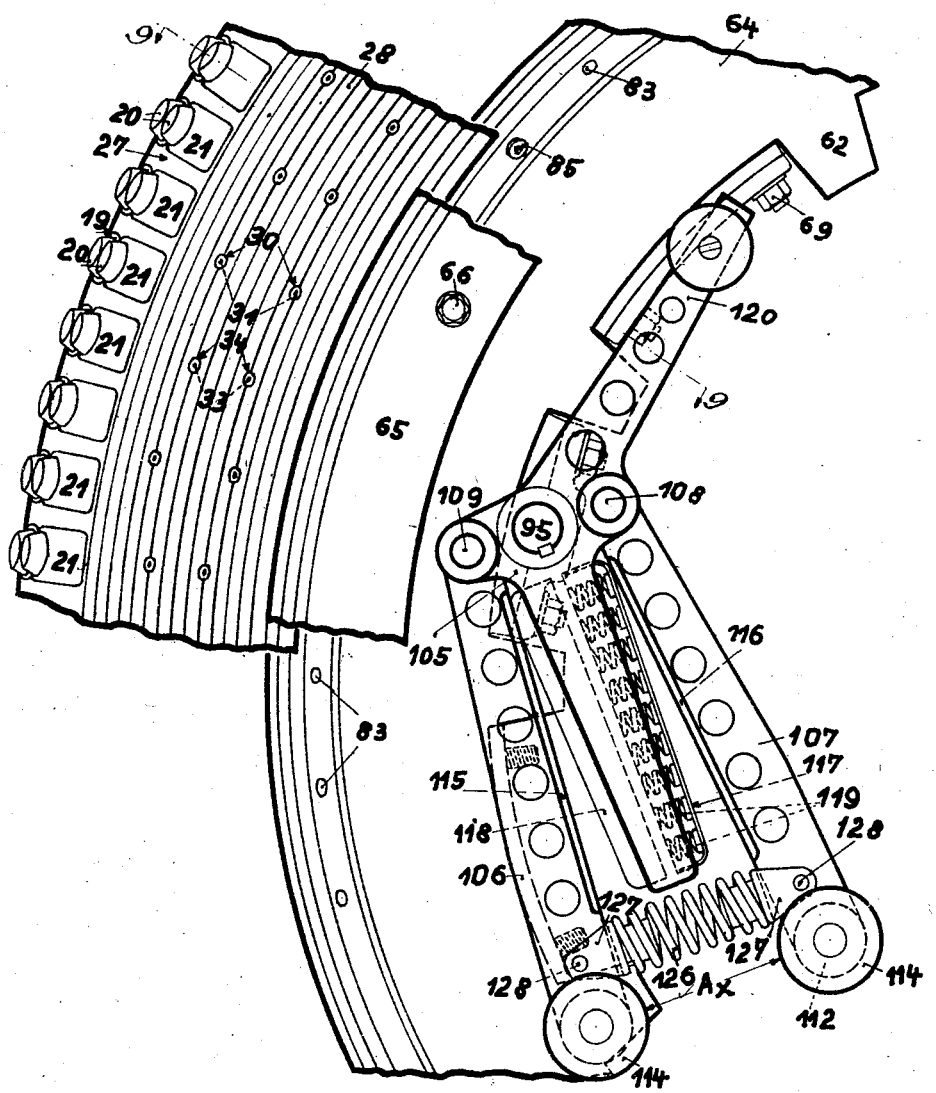
Fig. 7 is a rear elevation corresponding to Fig. 6.

Another feature of the invention resides in the provision of additional yielding means, shown in Figs. 1, 5, 6 and 7, and diagrammatically in Fig. 13. The purpose of this device is to keep the pressure elements E by an additional restraint, in their radial position or, more accurately, in the position assumed by them when no tangential forces act on the tread. They are further intended to transmit such external tangential forces from the tread to the felly. Each such means comprises an arm or lever 105 pivoted to an axle 95, in bearings fixed on felly 62. To this steering lever 105 is pivotally fastened at 108 an arm 107 carrying a guide roller 114 at its free end. A lever 105 cooperates with the arms 107, an elastic cushion 117 being interposed on each side of lever 105 as shown and kept apart by a coiled compression spring 126. This cushion, as best seen in Figs. 6 and 7, includes a series of springs 119 enclosed in a protective housing. A double cam 122 fastened to hub 2 by screws 123 shown in section in Figs. 2 and 5, and constituted by two flanges 124 and 125 formed on the guide-disk mounted on hub 2, cooperates with the roller 114 to operate the arm 107 and control the compression of the spring cushion 117 in accordance therewith. A similar arm 106 also carries a roller 114, cooperating with the cam on the opposite flange 125. These rollers bear against cam flanges 124 and 125 as shown in Figs. 5 and 13. Tubular portions, whose ends are shown at 49 and 50, telescope with one another and jointly form a core for the pressure member 48 in the form of a coiled spring. The latter is, in turn, surrounded by the elastic cover 55.

As shown in Fig. 7, the arms 106 and 107 are pivoted at 109 and 108 to the lever 120 which is keyed to axle 95. Lever 120 carries at its free end a counterpoise 121 bearing against the rim or felly as shown. It will be understood that while only one set of elements (106, 107, 120, etc.) is shown, that a plurality of such sets is preferably provided, spaced uniformly around the wheel. It will now be evident how a steering lever 105, operatively attached to the tubes indicated at 102 and their axle 95, transfers tangential forces applied at the tread, to the springs of cushion 117, whose reaction, forcing the arm 105 into its normal, central position, tends to coerce the corresponding pressure element E, into their normal, radial position. In order to give the cushion 117 a fulcrum for this corrective action, and to make this action bilateral, i. e. corrective of tangential tread-deformations in either direction, cushion 117 is held between the levers 106 and 107. The wheels 114 at their free ends are held by spring 126 on two concentric, approximately circular rails, 124, 125, fixed with regard to the vehicle, viz, on the cam-disc fastened to bearing 2. The outward radial thrust produced by centrifugal force on the portion pivoted at 95, i. e. cushion 117 and its appurtenances, is balanced, as far as possible, by a counterpoise adjustable on its arm 120.

The shapes of the concentric rails 124, 125, which closely approximate concentric circles, forming a channel, preferably adjust themselves to the experienced fact that during operation no portion of the tread changes its length. It can be plotted by finding for each pressure member E, i. e. for each position of the one within the tube at 100, the corresponding position of the wheels 114 in true form of the deformed tire, when no tangential forces act. This form is diagrammatically indicated in Fig. 13. When one cushion only is used, the preferred shape of each cam curve becomes an approximate ellipse with its major axis horizontal and with only slightly different axes. In case a plurality of cushions 117 are to be used, a similar method of plotting would result in more complicated geometrical shapes for the cams.

In operation, each yieldable means E, supports its own section of the tread, much as the air pressure in a pneumatic tire would do. In addition, the cam 122 serves to add resilient resistance to the movement of the ring, which varies with the angular position of the ring.

In Figure 13, the circle L indicates the normal configuration of the tread when unstressed. The broken line shows the tread as deformed under a load heavy enough to cause it to contact with the ground along a practically straight line at Y. X is the normal radius of L, while $X_2$, $X_3$, $X_4$ are radii lengthened by the stress. For convenient reference the tread has been divided into a front and rear straight portion, $N_z$ and $V_z$, and a front and rear curved portion $A_z$ and $F_z$, these terms referring to the direction I or K of the vehicle's course, and being practically interchangeable. The Greek $\alpha$ is the central angle subtended by the straightened portion of the stressed tread, while $\epsilon$ and $\gamma$ are the angles made by the latter with the compression members E. It is thought that Figure 13 which is drawn to scale will assist a clear insight into the operation of my wheel under loads normally to be expected.

Having disclosed one embodiment of my invention, and its mode of operation, I claim:—

1. An elastic tire having a yielding tread, a plurality of tensioning means, means whereby said tensioning means are supported within the tread, a rigid inner ring and mechanism to provide resilient resistance between the tire and the ring, varying in magnitude with the angular position of the said ring, said means including a cam.

2. An elastic tire having a yielding tread, a plurality of tensioning means, means whereby said tensioning means are supported within the tread, a rigid ring and mechanism to provide resilient resistance between the tire and the ring, varying in magnitude with the angular position of the said ring, said means including a cam and a pair of arms having a resilient cushion therebetween.

3. An elastic tire having a yielding tread, a plurality of tensioning means, means whereby said tensioning means are supported within the tread, a rigid ring and mechanism to provide resilient resistance between the tire and the ring, varying in magnitude with the angular position of the said ring, said means including a cam secured to the axle of the wheel, a pair of arms each having thereon a roller cooperating with said cam and resilient means between said arms, whereby rotation of the wheel provides varying compression of said resilient means.

In testimony whereof I affix my signature.

CURT RIESEBECK.